United States Patent [19]

Maegawa et al.

[11] Patent Number: 4,647,911

[45] Date of Patent: Mar. 3, 1987

[54] CALCULATOR WITH DEFINABLE KEYS

[75] Inventors: Toshiyuki Maegawa, Higashiosaka; Satoshi Tominaga, Nara, both of Japan

[73] Assignee: Sharp Kabushiki Kaisha, Osaka, Japan

[21] Appl. No.: 773,094

[22] Filed: Sep. 4, 1985

Related U.S. Application Data

[63] Continuation of Ser. No. 258,635, Apr. 29, 1981, abandoned.

[30] Foreign Application Priority Data

Apr. 30, 1980 [JP] Japan .................................. 55-59156

[51] Int. Cl.⁴ ................................................ G06F 3/02
[52] U.S. Cl. ............................ 340/365 R; 340/365 S; 340/365 VL; 364/709
[58] Field of Search .................. 179/90 B; 340/365 R, 340/365 S, 365 VL; 364/706, 709

[56] References Cited

U.S. PATENT DOCUMENTS

| | | | |
|---|---|---|---|
| 4,145,742 | 3/1979 | Olander | 364/709 |
| 4,241,333 | 12/1980 | Giebler | 340/365 S |
| 4,243,845 | 1/1981 | Feinberg | 179/90 B |
| 4,277,651 | 7/1981 | Fisher | 179/90 B |
| 4,291,385 | 9/1981 | Osborne | 364/709 |
| 4,324,954 | 4/1982 | Taylor | 179/90 B |

Primary Examiner—John W. Caldwell, Sr.
Assistant Examiner—Michael F. Heim
Attorney, Agent, or Firm—Birch, Stewart, Kolasch & Birch

[57] ABSTRACT

A programmable calculator is disclosed which has a plurality of keys each having a unique definition as an input key for introduction of instruction statements and constants through associated definition instructions. In the calculator, instruction definable keys each allow a definition instruction distinguishable from the first named definition instructions to be programmed. Each keys specific definition is defined by input keys which introduce different pieces of information as by depression of a conventional shift key. The information is introduced by the user to define the definable keys to perform desired instructions.

3 Claims, 2 Drawing Figures

CALCULATOR WITH DEFINABLE KEYS

This application is a continuation of application Ser. No. 258,635 filed on Apr. 29, 1981, now abandoned.

BACKGROUND OF THE INVENTION

This invention relates to a calculator having a plurality of definable keys each of which is given a specific definition as an input key for an instruction and a constant through execution of a specific definition instruction. More particularly, the present invention pertains to an electronic calculator wherein a definition instruction distingushable from the first named definition instructions is set up and said plurality of keys are given specific definitions as input keys which are useful in introducing different pieces of information by depression of a conventional shift key.

For the conventional programmable calculator, there is provided a keyboard with a number of alphanumeric keys, a common shift key and other kinds of keys. By depressing the shift key each of input keys is given no more than two definitions. However, this requires simultaneous actuations of the input and shift keys and complexity of key actuations.

OBJECTS AND SUMMARY OF THE INVENTION

Accordingly, it is an object of the present invention to provide a calculator capable of giving definable keys the meanings afforded by sequenced actuations of more than two keys, thus providing simplicity of complexed input statements or program instructions.

It is another object of the present invention to provide a calculator having a plurality of definable keys which do not require simutaneous actuation of one or more input keys and/or a common shift key.

In accordance with a preferred embodiment of the present invention, there is provided a calculator having a plurality of keys each having a unique definition as an input key for introduction of instruction statements and constants through associated definition instructions, said calculator characterized by setting up a definition instruction distingushable from the first named definition instructions and giving said plurality of keys specific definitions as input keys which are useful in introducing different pieces of information as by depression of a conventional shift key.

DETAILED DESCRIPTION OF THE INVENTION

Figure 1:
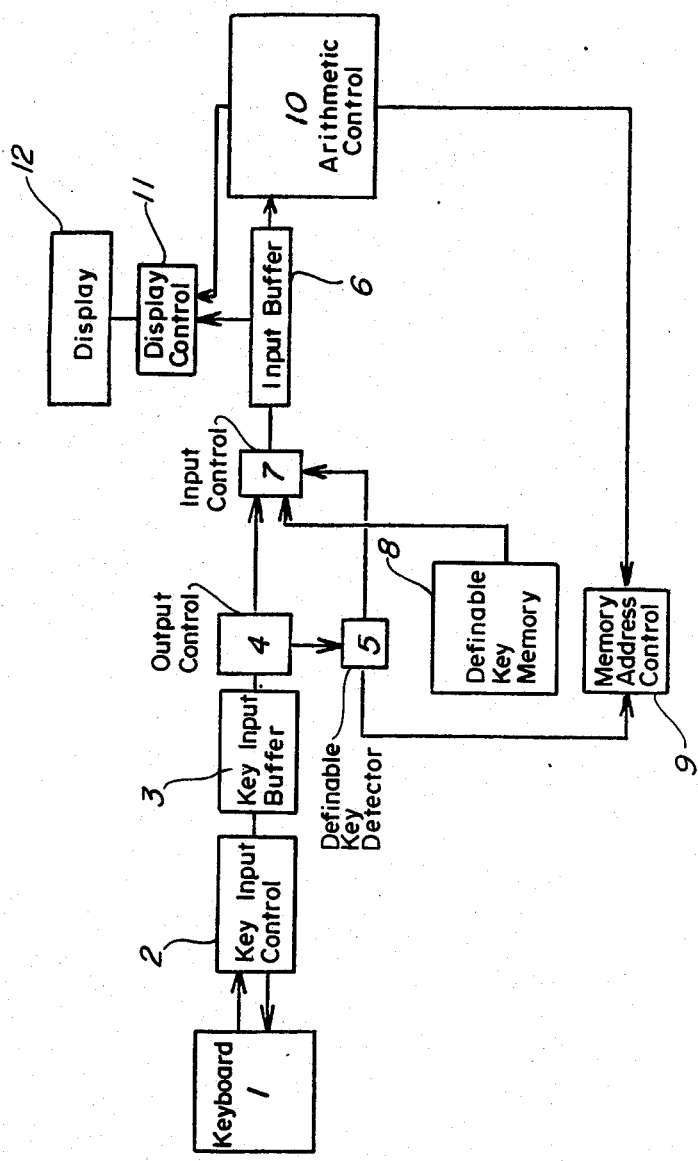
FIG. 1 is a block diagram of the scheme of an embodiment of the present invention.
Figure 2:
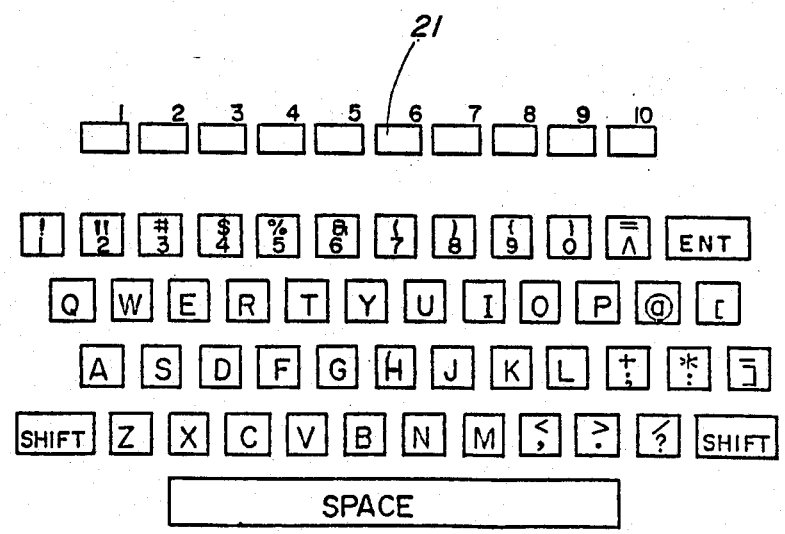
FIG. 2 is a view showing a keyboard in the illustrated embodiment.

Referring now to FIG. 1, there is illustrated an electronic programmable calculator according to an embodiment of the present invention. A keyboard section 1 includes a plurality of definable keys and alphanumeric keys and symbol keys the latter two of which are conventional in the art of typewriters. A major part of the keys included in the keyboard 1 is illustrated in FIG. 2. Only 10 definable keys 21 are shown in the embodiment of FIG. 2.

In FIG. 1, a key input control 2 is adapted to introduce sequentially key codes characteristic of depressed ones of the keys into a key input buffer 3. There is further provided an output control 4 for monitoring the contents of the key input buffer 3, a definable key detector 5, an input buffer 6 and an input control 7. Pursuant to the teachings of the present invention, a definable key memory 8 is provided which stores unique definitions (instructions, constants, etc.) of the definable keys 21 for respective ones of the keys. A memory control 9 is connected to the memory for providing address control and input/output control. As is obvious to one skilled in this art, the calculator comprises an arithmetic control 10, a display control 11 and a display 12.

The unique definitions of each of the definable keys are performed in the following manner. Assuming that the identifying number of a respective one of the definable keys is "n" and the content of its definition is "d", a definition instruction (DFKn, "d") is set up. When being supplied via the keyboard 1, this instruction is applied to the key input buffer 3 and the input buffer 6. In response to the instruction "DFK" applied the input buffer 6, the arithmetic control 10 places the content "d" of the definition as distinguished by the quotation mark (") into the (n)th location in the definable key memory 8 (this location is an area assigned for the (n)th definable key). Thereafter, upon actuation of the (n)th definable key the contents of the (n)th location of the memory 8 is applied to the input buffer 6 via input control 7 in a likemanner as inputs via the keyboard.

For example, if a definition instruction (DFK9, "PRINT A, B, C @") is supplied, then actuation of the ninth definable key permits the input buffer 6 to be loaded with the same contents as keys "PRINT, A, B, C ENTER" being depressed. It is noted that @ is an "at" mark key used to define the ENTER key.

The inputs introduced via the keyboard are supplied as key codes to the key input buffer 3. In sequentially transferring the contents of the input buffer 3 into the input buffer 6, the detector 5 decides if they are characteristic of codes of any definable key 21. In this case, rather than transferring these codes into the input buffer 6, the corresponding one of the definitions stored in the definable key memory 8 is supplied to the input buffer 6.

Automatic definition as a significant feature of the present invention will now be described as follows. The term automatic definition as used in the specification means a definition which said plurality of definable keys 21 are defined through execution of a certain instruction (called "automatic definition instruction" hereafter) as definitions equivalent to the respective inputs incapable of introducing information via the keyboard without actuating the shift key.

In the illustrated embodiment the definable keys are assigned sequential identifying numbers beginning with "1". The automatic definition instruction is therefore assigned "0" and designated "DFK 0" for distinction over the conventional definition instructions. Through execution of the automatic definition instruction "DFK 0" the respective definable keys are treated as the input keys incapable of introducing different pieces of information without actuating the shift key. For example, through execution of the automatic definition instruction the respective definable keys assigned "1" through "10" are defined as symbol keys "+, −, *, /, =, %, $, ", (,)." In other words, when the automatic definition instruction "DFK 0" is supplied to the input buffer 6, the arithmetic control 10 loads the definable key memory 8 with the respective symbol key codes characteristic of "+, −, *, /, −, %, $, ", (,)." The respective symbol key codes are stored in correspondence with the respective ones of the definable keys. For this reason the operator can introduce the above symbols without actuating the shift key.

In the case that the number of the different pieces of information capable of being introduced by actuation of the shift key is greater than the number of the definable keys, the operator may optionally select the kinds of information to be automatically defined. In other words, a RAM (preferably, normally supplied with power whether a power switch is ON or OFF) is provided to store the key codes of the number equal to the number of the definable keys and the key codes associated with the desired pieces of information are stored in the RAM. In accordance with the automatic definition key, the key codes stored in the RAM are supplied in sequence to the definable key memory.

It is very convenient if removable or erasable indicia are provided in the the association with the definable keys for indicating the contents of the definitions of these keys.

As stated previously, the calculator embodying the present invention can define the respective definable keys through execution of the automatic definition instruction as the input keys for introducing information of the kind is otherwise incapable of being introduced by actuation of the shift key, thus enhancing operability of the keyboard.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic calculator comprising:
    a plurality of input keys for introducing instruction statements and data into said calculator, said plurality of input keys including a set of instruction definable keys, each of said input keys producing a unique key code signal;
    processor means for receiving and processing said key code signals and for performing arithmetic calculations on said introduced data;
    definition means for storing definition information representing key code signals therein, said information corresponding to the desired function of each key in said set of instruction definable keys;
    definable key detection means monitoring said key code signals for detecting when an instruction definable key is actuated and inhibiting application of its associated key code signal to said processor means, said detection means presenting said key code signal associated with said instruction definable key to said definition means upon actuation of said instruction definable key;
    said definition means being responsive to said associated key code signal and providing corresponding definition information representative of the key codes of one or more said input keys to said processor means; and
    means responsive to key code signals produced by said input keys and received by said processor means, for introducing said key code signals to said definition means for storage therein as definition information;
    said means for introducing being responsive to a single instruction introduced by said plurality of input keys to collectively define all keys in said set of instruction definable keys by introducing definition into said definition means corresponding to the definition of each said instruction definable key.

2. The system of claim 1 wherein said definition means comprises:
    definition memory means for storing the definition information for each instruction definable key; and
    definition address means responsive to said associated key code signal for addressing a location in memory corresponding to that key code signal and having the definition information stored therein.

3. The system of claim 2 wherein said definition information associated with each instruction definable key corresponds to the information generated by the depression of the standard typewriter numeral key in conjunction with the standard typewriter shift key.

* * * * *